2,833,797
HYDROXYLATED STEROID DERIVATIVES

Emanuel B. Hershberg, West Orange, N. J., assignor to Schering Corporation, Bloomfield, N. J., a corporation of New Jersey No Drawing. Application December 30, 1957
Serial No. 705,811

5 Claims. (Cl. 260—397.47)

My invention relates to new and physiologically important steroid compounds. More particularly, my invention relates to certain 16α-hydroxy-1,4-pregnadienes which may be represented by the following formula:

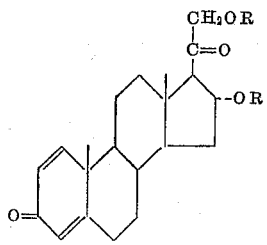

wherein R is a member of the group consisting of hydrogen, lower alkanoic acid radicals, and other ester groups described below.

Desoxycorticosterone (4-pregnene-21-ol-3,20-dione) is a known, active adrenal hormone with strong salt and water retention properties. It has been found that this sometimes undesirable salt and water retaining property is decreased considerably when desoxycorticosterone is hydroxylated in the 16α-position. However, this compound does not cause diuresis. I have discovered that by introducing a $\Delta^1$-double bond into 16α-hydroxy-desoxycorticosterone, the salt and water retention properties of the parent compound, desoxycorticosterone, is not only completely blocked but also causes diuresis. The 16α-hydroxy-diene- compounds block sodium reabsorption through the kidney glomerulae, and promote diuresis. These compounds are useful in the treatment of ascites, congestive heart failure, emotional edema, and cyclical edema (e. g. premenstrual).

The compounds of my invention may be used in the form of their ester derivatives of the 16- and 21-hydroxyl groups, as combinations and particularly as 21-monoesters. As with other corticosteroids, esterification is of value in extending the duration of activity, as for example is evidenced with the acetate, propionate, iso-valerate, enanthate, cyclopentylpropionate. Also valuable are the phenoxyacetates and substituted phenoxyacetates such as 4-chloro-, 2,4-dichloro-, 4-bromo-, 4-methyl-, 4-tertiary butyl-2,4,5-trichloro-, and 4-methoxyphenoxyacetates. Especially valuable are furoates and substituted furoates including the 5-bromo-, 5-chloro-, 5-methyl-, 5-tertiary butyl-furoates.

These compounds may also be used in the form of their water soluble ester derivatives at C-16 and C-21, such as monosodium salts of acids such as succinic, phthalic, sulfuric, phosphoric, and the like, and esters with glycinic or gluconic acid.

The compounds may be administered orally in the form of tablets or capsules, or parenterally as aqueous or oil suspension or solutions.

The novel compounds of my invention can readily be prepared by subjecting 16α-hydroxy-11-desoxycorticosterone or its esters, to the action of a $\Delta^1$-dehydrogenating micro-organism whereby the starting compound is transformed into the corresponding $\Delta^{1,4}$-diene-3,20-diketo steroid. The generally preferred starting compound is 16α-hydroxy-11-desoxycorticosterone, although the esters may be used, preferably the lower alkanoic esters, and particularly the acetates.

In the preferred procedure for the microbiological conversion there is employed as the modifying micro-organism a member of the family Corynebactriaceae, which includes the species *Corynebacterium simplex* (ATCC No. 6946). However, other dehydrogenating micro-organisms, for example, *Bacillus sphaericus* (ATCC No. 7055), have been found to be capable of accomplishing the desired conversion. The dehydrogenation is effected according to the procedure described in Belgian Patent No. 425,007, but substituting 16α-hydroxy-11-desoxycorticosterone or its esters as substrate.

Following the completion of the dehydrogenation process, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones, and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. In many instances, simple recrystallizations from a suitable solvent or solvent mixture, such as acetone, methylene chloride, ethanol, acetone-hexane, methylene chloride-hexane, etc. affords the desired 16α-hydroxydiene in excellent yield and high state of purity.

Although, as indicated above the ester groups may be present in the starting 16α-hydroxy-4-pregnene, the ester groups at the 16- and 21-positions are introduced preferentially following the microbiological dehydrogenation. The 21-hydroxy may be acetylated selectively by contacting for a relatively short period of time (approximately one hour) the di-hydroxy steroid with an appropriate acyl anhydride in the presence of pyridine. The di-ester may be prepared by allowing the reactants to remain in contact with each other for a longer period of time as, for instance, overnight.

Although the new compounds of my invention are preferentially prepared by the microbiological methods outlined above, they may also be prepared by alternative procedures such as chemical processes for introducing the $\Delta^1$-bond into the molecule; e. g. analogous methods described in the literature whereby the starting $\Delta^4$-3,20-diketo-21-ol-pregnenes are dehydrogenated by means of reactants such as selenium dioxide or chloranil or the double bonds are introduced by bromination followed by dehydrobromination.

The following examples are illustrative of methods for the manufacture of compounds of my invention, and not as indicating the scope of my invention.

EXAMPLE 1

*1,4-pregnadiene-16α-21-diol-3,20-dione*

From a solution of 30 g. of yeast extract (Difco) in 3.0 l. of tap water containing 13.2 g. of potassium dihydrogen phosphate and 26.4 g. of disodium hydrogen phosphate (pH of the solution 6.9) 27 portions of 100 ml. each are withdrawn, placed in 300 ml. Erlenmeyer flasks and sterilized by autoclaving for 15 minutes at 15 lb. steam pressure (120° C.). After autoclaving and cooling of the broth one ml. of a suspension of *Coryne-*

*bacterium simplex* (ATCC 6946) is placed in each flask. The flasks are then shaken on a shake table at 220 R. P. M. and 28° C. for 24 hours.

Into each of 27 Erlenmeyer flasks are placed 150 mg. of 4-pregnene-16α,21-diol-3,20-dione in alcohol. The flasks and contents are then sterilized for 15 minutes at 15 lb. steam pressure (120° C.). To each flask are then added 5.0 ml. of ethanol. The 24-hour bacterial culture is then transferred aseptically and the resulting suspensions are shaken on a shake table at 220 R. P. M. and 28° C. for 48 hours. The fine pH is 7.2.

The contents of all of the flasks are combined and extracted with a total of 9.0 l. of chloroform in three equal portions. The combined extracts are then concentrated to a residue which is crystallized from acetone-hexane. There results 1.1 g. of 1,4-pregnadiene-16α,21-diol-3,20-dione.

EXAMPLE 2

*1,4-pregnadiene-16α,21-diol-3,20-dione 21-acetate*

To a solution of 0.5 g. of 1,4-pregnadiene-16α,21-diol-3,20-dione in 5 ml. of anhydrous pyridine are added 3 ml. of acetic anhydride. The reaction mixture is permitted to stand one hour at room temperature, and is then diluted with ice and water. The resulting precipitate is filtered and recrystallized from acetone-hexane to yield 1,4-pregnadiene-16α,21-diol-3,20-dione 21-acetate.

EXAMPLE 3

*1,4-pregnadiene-16α,21-diol-3,20-dione 16,21-diacetate*

To a solution of 0.5 g. of 1,4-pregnadiene-16α,21-diol-3,20-dione in 5 ml. of anhydrous pyridine are added 3 ml. of acetic anhydride. The reaction mixture is permitted to stand overnight at room temperature, and is then diluted with ice and water. The resulting precipitate is filtered and recrystallized from acetone-hexane to yield 1,4-pregnadiene-16α,21-diol-3,20-dione 16,21-diacetate.

I claim:

1. Compounds of the group consisting of 1,4-pregnadiene-16α,21-diol-3,20-dione and the lower alkanoyl esters thereof.
2. 1,4-pregnadiene-16α,21-diol-3,20-dione.
3. Lower alkanoyl esters of 1,4-pregnadiene-16α,21-diol-3,20-dione.
4. 1,4-pregnadiene-16α,21-diol-3,20-dione 21-acetate.
5. 1,4-pregnadiene-16α,21-diol-3,20-dione 16,21-diacetate.

References Cited in the file of this patent

UNITED STATES PATENTS

| | | |
|---|---|---|
| 2,708,201 | Dodson et al. | May 10, 1955 |
| 2,709,705 | Perlman et al. | May 31, 1955 |
| 2,745,851 | Mooradian | May 15, 1956 |
| 2,789,118 | Bernstein et al. | Apr. 16, 1957 |